United States Patent
Luebke et al.

(10) Patent No.: US 9,243,174 B2
(45) Date of Patent: Jan. 26, 2016

(54) POLY(HYDROXYL URETHANE) COMPOSITIONS AND METHODS OF MAKING AND USING THE SAME

(71) Applicants: David Luebke, Bethel Park, PA (US); Hunaid Nulwala, Pittsburgh, PA (US); Chau Tang, Green Brook, NJ (US)

(72) Inventors: David Luebke, Bethel Park, PA (US); Hunaid Nulwala, Pittsburgh, PA (US); Chau Tang, Green Brook, NJ (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/171,094

(22) Filed: Feb. 3, 2014

(65) Prior Publication Data
US 2014/0182784 A1    Jul. 3, 2014

Related U.S. Application Data

(62) Division of application No. 13/288,390, filed on Nov. 3, 2011, now Pat. No. 8,912,303.

(51) Int. Cl.
*C09J 175/12* (2006.01)
*C09J 5/00* (2006.01)
*B32B 37/12* (2006.01)
*C08G 71/04* (2006.01)

(52) U.S. Cl.
CPC ............... *C09J 175/12* (2013.01); *C08G 71/04* (2013.01)

(58) Field of Classification Search
None
See application file for complete search history.

(56) References Cited

U.S. PATENT DOCUMENTS 5,763,622 A * 6/1998 Podszun et al. ............... 549/229
2012/0238661 A1 * 9/2012 Iyer et al. ...................... 523/106

OTHER PUBLICATIONS

Tang et al. "Tunable Polyhydroxyl urethane) from CO2-Based Intermediates Using Thiol-Ene Chemistry" Wiley, Mar. 9, 2011, p. 2024-2032.*
David Luebke; U.S. Appl. No. 13/288,390, filed Nov. 3, 2011.

* cited by examiner

*Primary Examiner* — Randy Gulakowski
*Assistant Examiner* — Jeffrey Washville
(74) *Attorney, Agent, or Firm* — Jacob A. Heafner; Brian J. Lally; John T. Lucas

(57) ABSTRACT

Methods and compositions relating to poly(hydroxyl urethane) compounds are described herein that are useful as, among other things, binders and adhesives. The cross-linked composition is achieved through the reaction of a cyclic carbonate, a compound having two or more thiol groups, and a compound having two or more amine functional groups. In addition, a method of adhesively binding two or more substrates using the cross-linked composition is provided.

8 Claims, 3 Drawing Sheets

POLY(HYDROXYL URETHANE) COMPOSITIONS AND METHODS OF MAKING AND USING THE SAME

RELATED APPLICATIONS

The present application is a divisional of and claims priority to U.S. patent application Ser. No. 13/288,390, filed on Nov. 3, 2011 by the same inventors, the entirety of which is hereby incorporated by reference.

GOVERNMENT INTEREST

The United States Government has rights in this invention pursuant to the employer-employee relationship between the Government and one or more of the inventors who are U.S. Department of Energy employees at the National Energy Technology Laboratory, Pittsburgh, Pa.

FIELD OF THE INVENTION

One or more embodiments consistent with the present disclosure relate to cross-linked poly(hydroxyl urethane) compositions and methods of their preparation and use.

BACKGROUND

Polyurethanes are compounds useful in many applications, including but not limited to high performance adhesives, surface coatings and sealants, binders, hydrogels, and resins. A polyurethane compound is any polymer composed of a chain of organic units joined by carbamate (—NCOO—) links. Polyurethanes are conventionally formed in the reaction of a diisocyanate and polyfunctional compounds typically containing numerous hydroxyl groups, such as a diol, in the presence of a catalyst. However, a disadvantage to this synthetic route is the use of monomers having numerous toxic isocyanate groups.

Recently, some attention has been focused on the synthesis of polyurethanes without the use of isocyanate groups through the reaction of a diamine and a molecule having one or more cyclic carbonate functional groups in the presence of a solvent and catalyst. This reaction results in compounds often referred to as polyhydroxy urethanes (PHUs) due to the presence of primary and/or secondary hydroxyl functional groups.

SUMMARY

One or more embodiments consistent with the present disclosure generally relate to a composition comprising a reaction product of: (1) one or more compounds having at least one cyclic carbonate group having one or more functional groups containing one or more carbon-carbon double or triple bonds; (2) one or more compounds having two or more thiol groups; and, (3) one or more compounds having two or more amine functional groups, in which a cross-linked poly(hydroxyl urethane) is produced.

Additional embodiments consistent with the present disclosure relate to processes to prepare a cross-linked poly (hydroxyl urethane) composition including the steps of: contacting (1) one or more compounds having at least one cyclic carbonate group having one or more functional groups containing one or more carbon-carbon double or triple bonds; (2) one or more compounds having two or more thiol groups; and, (3) one or more compounds having two or more amine functional groups.

Additional embodiments consistent with the present disclosure relate to methods of adhesively bonding two or more substrates to each other in which a cross-linked poly(hydroxyl urethane) composition as described above is applied to one or more substrates, which are subsequently contacted via the applied poly (hydroxyl urethane) composition.

One or more advantages consistent with the present disclosure are related to cross-linked PHUs that are easily accessible and tunable from carbonates and amines. The cross-linked PHUs are accessed via a single step reaction that is a modular and facile reaction between amines and multi-functional cyclic carbonates that are prepared from -thiol and -ene derivatives. Both reactions are atomically efficient and produce solid in high yields without the use of a solvent or catalyst. The synthetic routes presented herein are facile and represent a less toxic, non-isocyanate pathway to obtain polyurethane compositions. In addition, the synthetic approach allows for various properties to be tuned, including but not limited to glass transition temperature, modulus and content of hydroxyl compounds.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION

Figure 1:
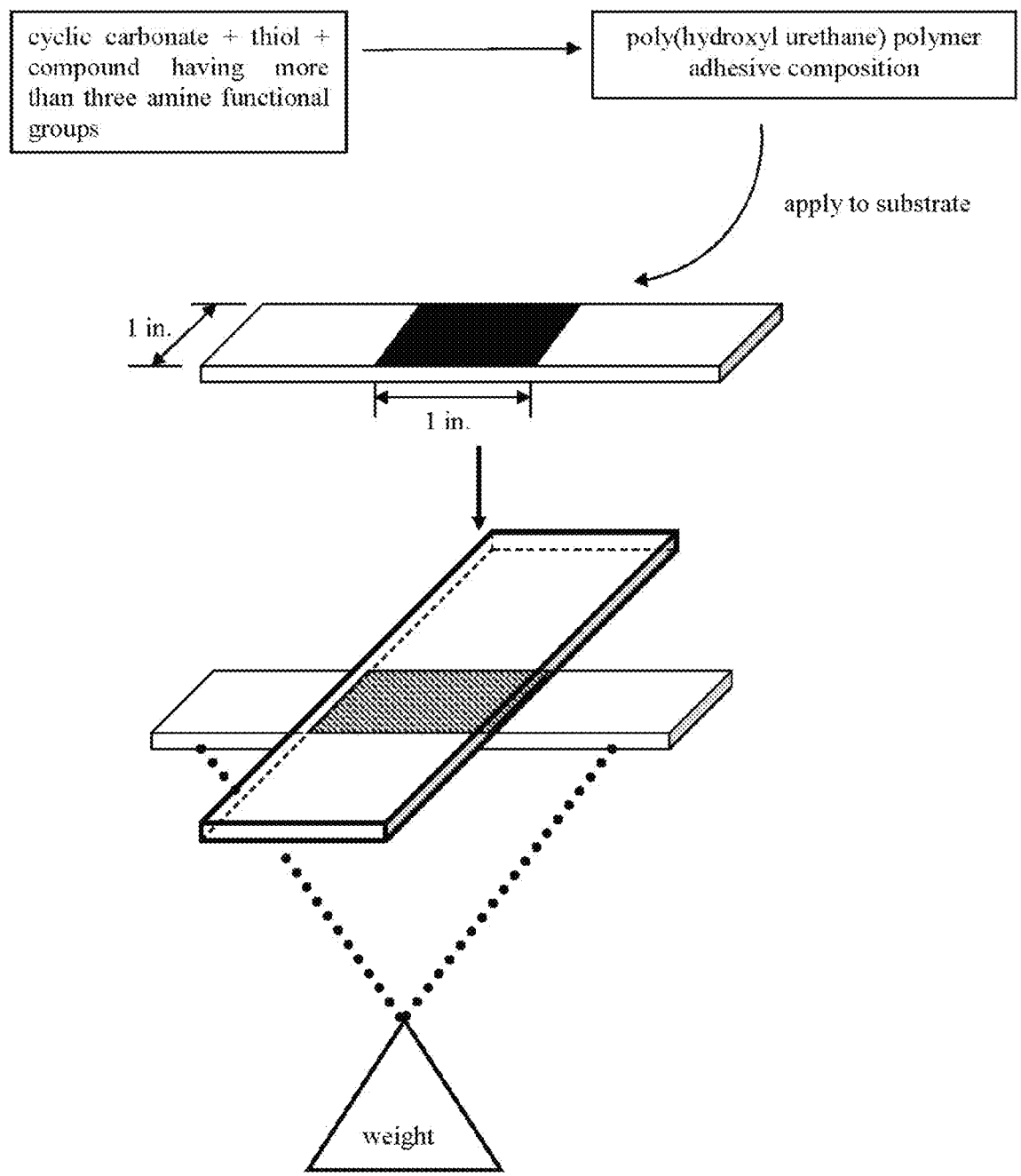
FIG. 1 is a representation of an adhesion test performed with a poly(hydroxyl urethane) composition prepared according to one or more embodiments described herein.
Figure 2A:
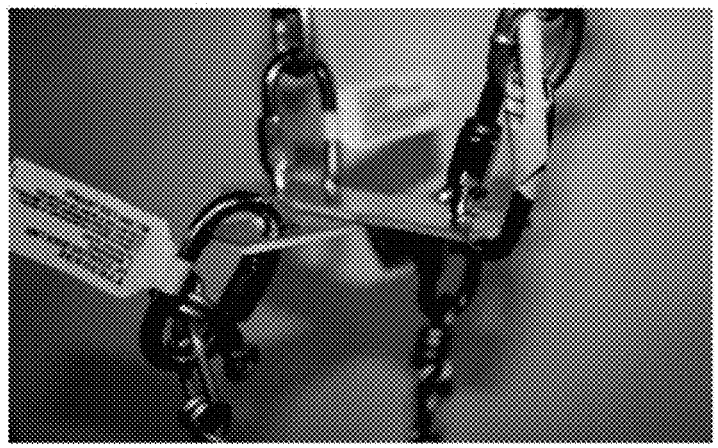
FIGS. 2A and 2B are pictorial representations of one experimental set-up of the adhesion test.
Figure 2B:
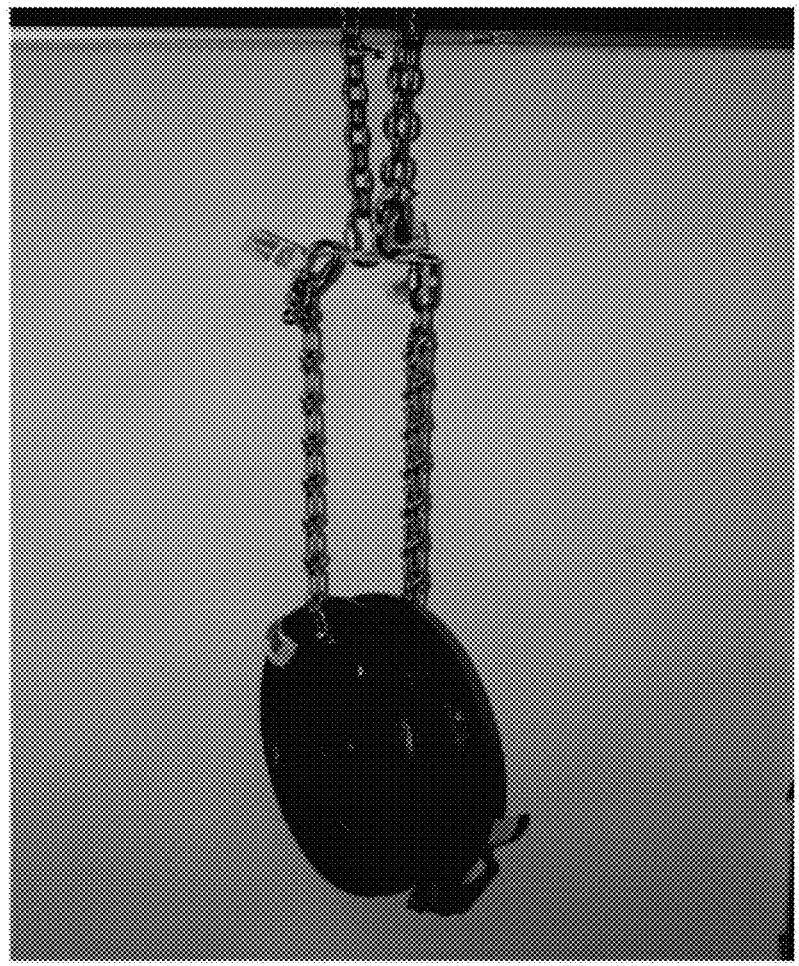
Figure 3A:
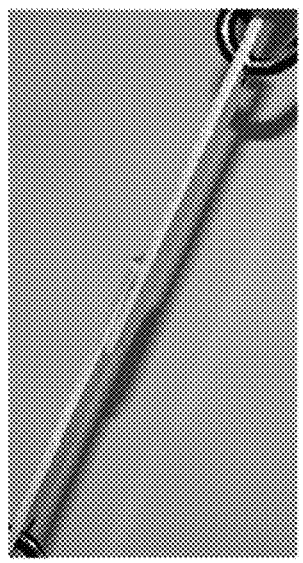
FIGS. 3A and 3B are pictorial representations of another experimental set-up of the adhesion test.
Figure 3B:
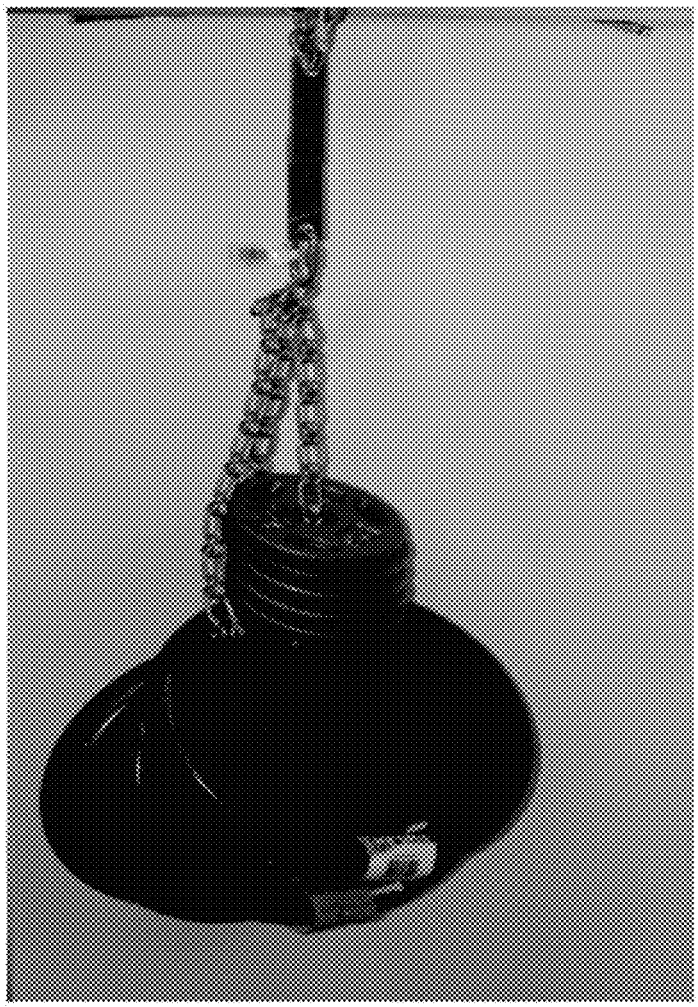

One or more embodiments consistent with the present disclosure provide a cross-linked poly(hydroxyl urethane) composition comprising a reaction product of: (1) one or more compounds having at least one cyclic carbonate group, wherein the cyclic carbonate comprises one or more functional groups having one or more carbon-carbon double or triple bonds; (2) one or more compounds having two or more thiol groups; and, (3) one or more compounds having two or more amine functional groups.

Another embodiment relates to a composition comprising a reaction product of: (1) one or more compounds having at least one cyclic carbonate group, wherein the cyclic carbonate comprises one or more functional groups having one or more carbon-carbon double or triple bonds; (2) one or more compounds having three or more thiol groups; and, (3) one or more compounds having two or more amine functional groups.

Another embodiment relates to a composition comprising a reaction product of: (1) one or more compounds having at least one cyclic carbonate group, wherein the cyclic carbonate comprises one or more functional groups having one or more carbon-carbon double or triple bonds; (2) one or more compounds having two or more thiol groups; and, (3) one or more compounds having three or more amine functional groups.

Another embodiment relates to a composition comprising a reaction product of: (1) one or more compounds having at least one cyclic carbonate group, wherein the cyclic carbonate comprises one or more functional groups having one or more carbon-carbon double or triple bonds; (2) one or more compounds having two or more thiol groups; and, (3) two or more compounds having two or more amine functional groups. In yet another embodiment, at least one of the (3) compounds has two or more amine groups and at least one (3) compound has three or more amine groups.

Another embodiment relates to a composition comprising a reaction product of: (1) two or more compounds having at least two cyclic carbonate groups, wherein the cyclic carbonates comprise one or more functional groups having one or more carbon-carbon double or triple bonds; (2) one or more compounds having two or more thiol groups; and, (3) one or more compounds having three or more amine functional groups.

One or more additional embodiments consistent with the present disclosure relate to a composition comprising a reaction product of: (1) a first reactant comprising a reaction product of: (a) one or more compounds having at least one cyclic carbonate group, wherein the cyclic carbonate comprises one or more functional groups having one or more carbon-carbon double or triple bonds, and (b) one or more compounds having two or more thiol groups; and (2) a second reactant comprising one or more compounds having three or more amine functional groups. In yet another embodiment, the composition further comprises a reaction product of a third reactant comprising a compound having two or more amine functional groups.

Another embodiment relates to a composition comprising a reaction product of: (1) a first reactant comprising a reaction product of: (a) one or more compounds having at least one cyclic carbonate group, wherein the cyclic carbonate comprises one or more functional groups having one or more carbon-carbon double or triple bonds, and (b) one or more compounds having three or more thiol groups; and (2) a second reactant comprising one or more compounds having two or more amine functional groups.

Yet another embodiment consistent with the present disclosure relates to a composition comprising a reaction product of: (1) a first reactant comprising a reaction product of: (a) one or more compounds having at least one cyclic carbonate group, wherein the cyclic carbonate comprises one or more functional groups having one or more carbon-carbon double or triple bonds, and (b) one or more compounds having three or more amine functional groups; and, (2) a second reactant comprising one or more compounds having two or more thiol groups.

Yet another embodiment consistent with the present disclosure relates to a composition comprising a reaction product of: (1) a first reactant comprising a reaction product of: (a) one or more compounds having at least one cyclic carbonate group, wherein the cyclic carbonate comprises one or more functional groups having more than one carbon-carbon double or triple bonds, and (b) one or more compounds having two or more amine functional groups; and, (2) a second reactant comprising one or more compounds having three or more thiol groups.

The cyclic carbonate, thiol and amine compounds consistent with the present disclosure are described in more detail below.

Additional embodiments relate to processes to prepare a cross-linked poly(hydroxyl urethane) composition comprising the step of: contacting (1) one or more compounds having at least one cyclic carbonate groups, wherein the cyclic carbonate comprises one or more functional groups having one or more carbon-carbon double or triple bonds; (2) one or more compounds having two or more thiol groups; and, (3) one or more compounds having two or more amine functional groups.

Additional embodiments relate to processes to prepare a cross-linked poly(hydroxyl urethane) composition comprising the step of: contacting (1) one or more compounds having at least one cyclic carbonate groups, wherein the cyclic carbonate comprises one or more functional groups having one or more carbon-carbon double or triple bonds; (2) one or more compounds having two or more thiol groups; and, (3) one or more compounds having three or more amine functional groups.

Another embodiment involves the step of: contacting (1) one or more compounds having at least one cyclic carbonate groups, wherein the cyclic carbonate comprises one or more functional groups having one or more carbon-carbon double or triple bonds; (2) one or more compounds having three or more thiol groups; and, (3) one or more compounds having two or more amine functional groups.

A further embodiment is directed to the steps of: contacting (1) one or more compounds having at least one cyclic carbonate groups, wherein the cyclic carbonate comprises one or more functional groups having one or more carbon-carbon double or triple bonds; (2) one or more compounds having two or more thiol groups; and, (3) two or more compounds having two or more amine functional groups, wherein at least one of the compounds has three or more amine functional groups. The cyclic carbonate, thiol and amine compounds compatible with the processes described herein are as described in more detail below.

Additional embodiments consistent with the present disclosure relate to a process for preparing a cross-linked poly(hydroxyl urethane) composition comprising the steps of: (1) combining (a) one or more compounds having at least one cyclic carbonate, wherein the cyclic carbonate comprises one or more functional groups having one or more carbon-carbon double or triple bonds with (b) one or more compounds having two or more thiol groups to form a first reaction product comprising a multifunctional cyclic carbonate; and, (2) combining the first reaction product with one or more compounds having three or more amine functional groups to form a second reaction product comprising a cross-linked poly(hydroxyl urethane) composition. Another variation of this embodiment relates to using one or more compounds having three or more thiol groups in step (1) and one or more compounds having two or more amine functional groups in step (2). An additional embodiment relates to using two or more compounds having two or more cyclic carbonate groups in step (1).

In additional embodiments, the multifunctional cyclic carbonate is obtained by exposing the first reaction mixture (of a cyclic carbonate compound and a thiol compound) to UV light at room temperature or heating in the presence of a thermal initiator such as AIBN or benzoyl-peroxide.

Also consistent with the present disclosure is that the second reaction product is obtained by heating the first reaction product (a multifunctional cyclic carbonate) and compound having three or more amine functional groups at temperatures between about 25° C. and about 80° C.

Additional embodiments consistent with the present disclosure relate to a process for preparing a cross-linked poly(hydroxyl urethane) composition comprising the steps of: (1) combining (a) one or more compounds having at least one cyclic carbonate, wherein the cyclic carbonate comprises one or more functional groups having one or more carbon-carbon double or triple bonds with (b) one or more compounds having three or more amine functional groups to form a first reaction product; and, (2) combining the first reaction product with one or more compounds having two or more thiol groups to form a second reaction product comprising a cross-linked poly(hydroxyl urethane) composition. Another variation of this embodiment relates to using a compound having two or more amine functional groups in step (1) and a compound having three or more thiol groups in step (2). Consistent with this embodiment is that the second reaction product is obtained by exposing the combined first reaction product and one or more compounds having two or more thiol groups to UV light.

One important advantage to the above methods is that no solvent or catalyst is required to achieve the necessary reactions.

A cyclic carbonate compound compatible with one or more embodiments described above have the structure of Formula (I):

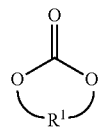

Formula (I)

wherein $R^1$ is $-(CR^2R^3)_n-$, wherein $2 \leq n \leq 4$, and wherein $R^2$ and $R^3$ are each independently hydrogen, straight chain or branched alkane, alkene or alkyne, optionally substituted with at least one member selected from the group consisting of $NH_2$, SH, COO and OH, and further wherein at least one $R^2$ or $R^3$ is a straight chain or branched alkene or alkyne.

In an exemplary embodiment, at least one of $R^2$ or $R^3$ is an alkene having the formula $-CH=CH_2$ or an alkyne having the formula $-C\equiv CH$.

In additional examples, the cyclic carbonate is selected from the group consisting of 4-vinyl-1,3-dioxolan-2-one, vinylene carbonate, and 4-ethyl-4-methyl-5-methylene-1,3-dioxolan-2-one.

In addition, thiol compounds consistent with the present disclosure have the following structure:

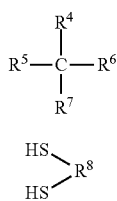

Formula (II)

Formula (III)

wherein at least two of $R^4$, $R^5$, $R^6$ and $R^7$ are a thiol, further wherein $R^4$, $R^5$, $R^6$ and $R^7$ are each independently hydrogen, straight chain, branched or cyclic alkane, alkene or alkyne, or ester, and optionally substituted with at least one member selected from the group consisting of $NH_2$, SH, COO, SiO and OH; and, wherein $R^8$ contains an aromatic group.

In one embodiment, $R^4$ and $R^5$ are $CH_2CH_2SH$, $R^6$ is H and $R^7$ is $CH_2$.

In an additional embodiment, $R^4$, $R^5$ and $R^6$ are $CH_2COOCH_2CH_2SH$ and $R^7$ is $CH_2CH_3$.

In yet another embodiment, $R^4$, $R^5$, $R^6$ and $R^7$ are $CH_2COOCH_2CH_2SH$.

In yet another embodiment, $R^8$ is a biphenyl group.

In addition, compounds having three or more amine functional groups consistent with the present disclosure have the following structure:

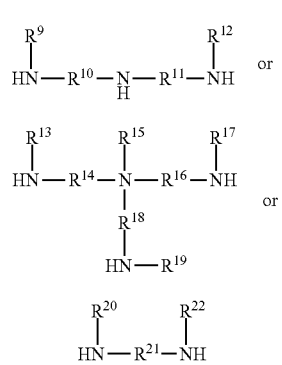

Formula (IV)

Formula (V)

Formula (VI)

wherein $R^9$, $R^{12}$, $R^{13}$, $R^{17}$, $R^{19}$, $R^{20}$ and $R^{22}$ are each independently chosen from hydrogen and a straight chain or branched alkane or alkene, optionally substituted with at least one member selected from the group consisting of $NH_2$, SH, COO and OH, and optionally containing from 1 to 8 ether bridges and/or from 1 to 3 tertiary amine bridges;

$R^9$ and $R^{12}$ or $R^{13}$ and/or $R^{17}$ and/or $R^{19}$ or $R^{20}$ and $R^{22}$ may be linked together to form a ring;

$R^{10}$, $R^{11}$, $R^{14}$, $R^{16}$, $R^{18}$ and $R^{21}$ are each independently chosen from a straight chain or branched alkane, alkene or alkyne, optionally substituted with at least one member selected from the group consisting of $NH_2$, SH, COO and OH, and optionally containing from 1 to 8 ether bridges and/or from 1 to 3 tertiary amine bridges; and, $R^{15}$ is hydrogen or alkyl.

Exemplary compounds having three or more amine functional groups can be selected from the group consisting of: diethylenetriamine, triethylenetetramine, spermidine, spermine, melamine(1,3,5-triazine-2,4,6-triamine), TACN (1,4,7-triazacyclononane), cyclen (1,4,7,10-tetraazacyclododecane), hexamethylenetetramine, tetraethylenepentamine, pentaethylenehexamine, dipropylenetriamine, bis(3-aminopropyl)-amine, N,N-bis(3-aminopropyl)-ethylenediamine, bishexamethylenetriamine, and heptaethyleneoctamine.

Additional embodiments consistent with the present disclosure relate to methods of adhesively bonding two or more substrates to each other in which a poly(hydroxyl urethane) composition as described herein is applied to at least one of the two or more substrates, which are subsequently contacted via the applied poly (hydroxyl urethane) composition.

DEFINITIONS

In describing the disclosed subject matter, the following terminology will be used in accordance with the definitions set forth below.

Unless stated otherwise, the term "cyclic carbonate" as used herein refers to a cyclic compound having a carbonate ($CO_3$) group as part of the cyclic compound. For example, a cyclic carbonate may have the following structure:

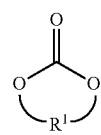

wherein $R^1$ is —$(CR^2R^3)_n$—, wherein $2 \leq n \leq 4$, and wherein $R^2$ and $R^3$ are independently various functional groups as further defined herein.

The term "multifunctional cyclic carbonate" refers to a compound having two or more cyclic carbonate groups.

Unless stated otherwise, the term "thiol" as used herein refers to an organosulfur compound that contains at least one carbon-bonded sulfhydryl (—C—SH or R—SH), or thiol, group, where R represents an alkane, alkene, or other carbon compound.

As used herein, the term "amine functional group" refers to compounds that have a basic nitrogen atom with a lone pair of electrons, including compounds having the general formulas: $R^1$—$NH_2$ (primary amines), $R^1R^2$—NH (secondary amine), and $R^1R^2R^3$—N (tertiary amine), where R is an organic substituent.

The expression "straight-chain or branched alkane or alkene" is meant to indicate that $C_1$ and $C_2$ are straight-chain, and the remaining carbon atoms may be straight-chain or branched and may include one or more carbon-carbon double bonds.

When referring to an alkane, alkene or alkyne, the term "optionally substituted with at least one member selected from the group consisting of" means that one or more hydrogens on the carbon chain may be independently substituted with one or more of at least one member of the group. For example, substituted $C_2H_5$ may be, without limitations, $CHNH_2CH_3$ or $CH_2CH_2OH$.

The reference to alkanes, alkenes and alkynes containing an "ether bridge" refers to an alkane, alkene or alkyne radical wherein a carbon atom is replaced by an oxygen atom, for a group such as —C—O—C—.

The reference to alkanes, alkenes and alkynes containing an "tertiary amine bridge" refers to a radical wherein a tertiary amine groups is present between two carbon atoms, forming a group of formula —C—NR—C—, wherein R represents an alkyl or aryl group, preferably containing from 1 to 15 carbon atoms.

As described above, one or more embodiments consistent with the present disclosure relate to a composition and method of preparing a poly(hydroxyl urethane) composition.

General Synthetic Route to a Cross-Linked Poly(Hydroxyl Urethane) Composition

Cyclic carbonate compounds compatible with one or more embodiments of the present disclosure are available commercially and can be accessed via a number of synthetic pathways, including through the reaction of various compounds with $CO_2$, e.g., an epoxide compound.

Multifunctional cyclic carbonates consistent with the present disclosure are accessed through thiol-ene chemistry. This synthetic pathway is appealing due to the robust and orthogonal nature of the reaction, quantitative yields and optional use of solvents. Referring to the synthetic outline depicted below, various cyclic carbonates may be mixed with a compound having two or more thiol groups and an initiator which are subsequently exposed to UV light at room temperature or heat (using a thermal initiator such as AIBN or Benzoyl-peroxide) to produce a multifunctional cyclic carbonate.

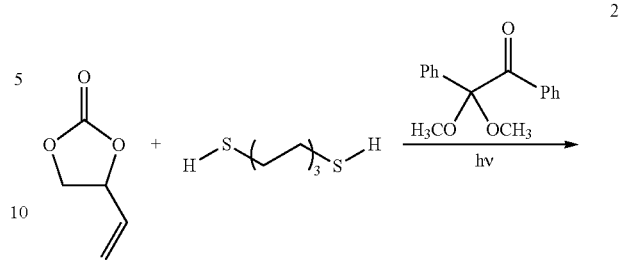

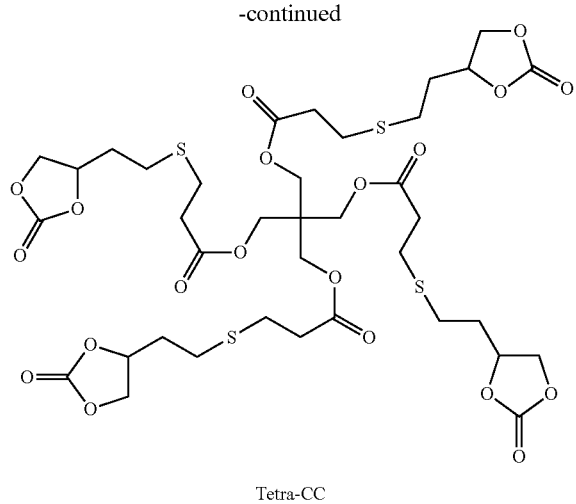

Tetra-CC

The amount of cyclic carbonate in relation to thiol used in the above reaction depends on the number of thiol groups in the thiol compound. For example, in Scheme 2 above, the ratio of carbonate to thiol is approximately 2:1 in order to obtain a multifunctional cyclic carbonate having two cyclic carbonate groups. Similarly, Schemes 3 and 4, use a ratio of cyclic carbonate to thiol of approximately 3:1 and 4:1 to obtain a multifunctional cyclic carbonate having three and four cyclic carbonate groups, respectively.

An equimolar amount of the multifunctional cyclic carbonate may subsequently be mixed with a compound having three or more amine functional groups and heated to create a cross-linked poly(hydroxyl urethane) composition, as depicted in the scheme depicted below for the multifunctional cyclic carbonates produced above.

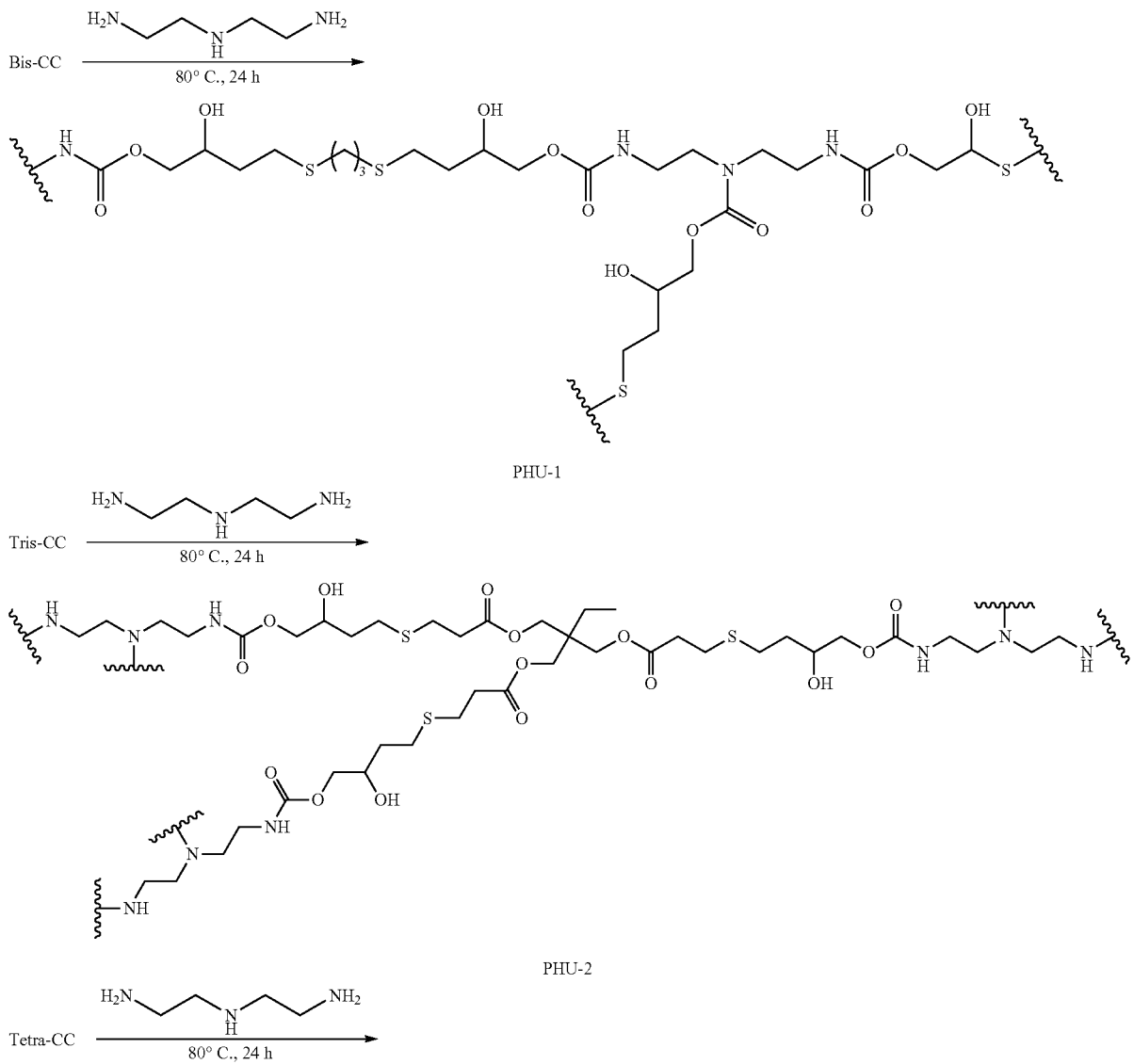

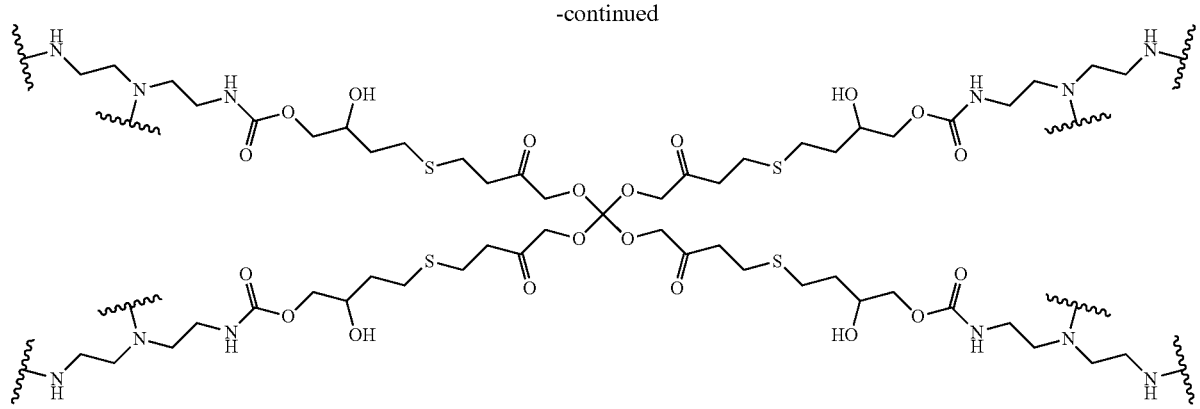

PHU-3

An additional benefit of the methods consistent with the present disclosure is the option of a different curing approach. More specifically, a ring opening of a cyclic carbonate compound may occur through the reaction with a compound having three or more amine functional groups. Subsequent reaction with a compound having two or more thiol groups and exposure to UV light or heat will also yield a cross-linked poly(hydroxyl urethane) composition consistent with the present disclosure. For example, a cyclic carbonate containing vinyl group can be reacted with a multi-amine by heating the mixture at 80° C. to yield multi-vinyl hydroxyl-urethane compound. The multi-vinyl hydroxyl-urethane can be further reacted with thiol either by UV or thermal route to yield the cross-linked poly(hydroxyl urethane) polymer.

Also consistent with the present disclosure is the synthesis of cross-linked poly(hydroxyl urethane) compositions utilizing a cyclic carbonate compound, a compound having more than two amine functional groups, and a compound having more than three thiol groups. This synthetic route is substantially similar to the above description. For example, a cyclic carbonate is mixed with a compound having three or more thiol group and an initiator, such as 2,2-dimethoxy-2-phenylacetophenone (UV route) or AIBN (thermal route) to form a multifunctional cyclic carbonate having three or more cyclic carbonate groups. The ratio of cyclic carbonate to thiol is similar to the above description, i.e., for a compound having three thiol groups an appropriate ratio of cyclic carbonate to thiol compound is approximately 3:1. Subsequently, the multifunctional cyclic carbonate compound is reacted with an equimolar amount of a compound having two or more amine functional groups and heated to form a cross-linked poly (hydroxyl urethane) compound.

Alternatively, ring opening of the cyclic carbonate can be achieved with a compound having two or more amine functional groups. The resulting compound is then contacted with a compound having three or more thiol groups and exposed to UV light or heat to obtain a poly(hydroxyl urethane) composition consistent with the present disclosure.

EXAMPLES

Materials

Diethylenetriamine (DETA), 4-vinyl-1,3-dioxolan-2-one (99%), 1,6-hexanedithiol (>97%), trimethylolpropane tris(3-mercaptopropionate), pentaerythritol tetrakis(3-mercaptopropionate) (97%), 1,6-diaminohexane (98%), and 2,2-dimethoxy-2-phenylacetophenone (99%) were used as received from Sigma-Aldrich. Lithium bromide, octylamine, and a Spectroline UV lamp (Model ENF-280C, 8W) were acquired from Fisher Scientific. Chloroform-d ($CDCl_3$) was purchased from Cambridge Isotope Laboratory.

Methods $^1$H (500 or 700 MHz) and $^{13}$C (126 or 176 MHz) NMR spectra were recorded in $CDCl_3$ on a Bruker Avance III 500 or 700 spectrometer. Fourier transform infrared (FT-IR) spectra were measured using a Nicolet IR100 FT-IR spectrometer, equipped with an attenuated total reflectance (ATR) accessory with a diamond crystal. A Mettler Toledo TGA/DSC 1 was used to measure the decomposition temperature, which was determined as 5% mass loss, at a heating rate of 10° C./min under nitrogen. A TA Instruments Q200 differential scanning calorimeter equipped with the Refrigerated Cooling System 40 accessory was used to determine glass transition temperatures ($T_g$s), which are taken as the mean of the second and third heating scans. The experiments were conducted under nitrogen at a heating rate of 10° C./min.

Mass spectroscopy was performed using an Agilent 6420 Triple Quadrupole (QQQ) LC-MS/MS (Agilent Technologies, Santa Clara, Calif.). Agilent Mass Hunter software (Version B.02.01) was used for data acquisition and processing. The samples were directly infused into the mass spectrometer and eluted at 0.4 mL/min using ethyl acetate. The flow rate of the drying gas ($N_2$) was 11 L/min, and the gas temperature was 350° C. The MS fragmentor voltage was fixed at 250 V.

A number of the examples described herein are also described in Tang, C. N., Nulwala, H. B., Damodaran, K., Kaur, P. and Luebke, D. R. (2011), Tunable poly(hydroxyl urethane) from $CO_2$-Based intermediates using thiol-ene chemistry, *Journal of Polymer Science Part A: Polymer Chemistry*, 49: 2024-2032, the entirety of which is hereby incorporated by reference.

Example 1

Preparation of PHU-1

2,2-Dimethoxy-1,2-diphenylethanone (0.200 g, 0.780 mmol), 4-vinyl-1,3-dioxolan-2-one (10.2 g, 89.4 mmol), and hexane-1,6-dithiol (6.57 g, 43.7 mmol) were added to an aluminum pan to prepare Bis-CC. The mixture was irradiated for 1 hour using a UV lamp (365 nm). The conversion was quantitative as confirmed using either GC analysis, 1H NMR spectroscopy, or FTIR spectroscopy. The product was used without further purification. 1H NMR (700 MHz, CDCl$_3$, δ): 1.36 (dt, J$_1$=7.25 Hz, J$_2$=3.63 Hz, CH$_2$, 4H), 1.47-1.59 (m, CH$_2$, 4H), 1.85-1.95 (m, CH$_2$, 2H), 2.02-2.14 (m, CH$_2$, 2H), 2.49 (t, J$_1$=7.25 Hz, S—CH$_2$, 4H), 2.54-2.61 (m, S—CH$_2$, 2H), 2.61-2.71 (m, S—CH$_2$, 2H), 4.09 (dd, J$_1$=8.67 Hz, J$_2$=7.09 Hz, O—CH$_2$, 2H), 4.56 (dd, J$_1$=8.67 Hz, J$_2$=7.09 Hz, O—CH$_2$, 2H), and 4.86 (qd, J$_1$=7.78 Hz, J$_2$=4.41 Hz, O—CH, 2H). $^{13}$C NMR (176 MHz, CDCl$_3$, δ): 27.11 (S—CH$_2$), 28.30 (S—CH$_2$), 29.31 (CH$_2$), 32.23 (CH$_2$), 33.93 (CH$_2$), 69.30 (O—CH$_2$), 75.71 (O—CH(CH$_2$)$_2$), and 154.8 (C=O). ATR-IR (cm$^{-1}$): 466, 714, 770, 1054, 1155, 1378, 1437, 1779 (C=O), 2854, and 2927. MS (m/z): calculated for C$_{16}$H$_{26}$O$_6$S$_2$, 378.12. found, 401.11 [M+Na]$^+$.

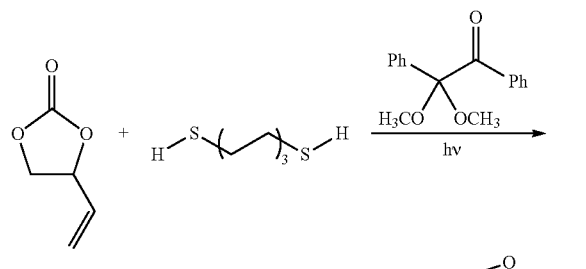

Bis-CC

PHU-1s were synthesized from Bis-CC prepared above (0.583 g, 1.54 mmol) and DETA (0.166 g, 1.61 mmol) without a catalyst for 24 and 72 hours and with LiBr as a catalyst for 48 hours. In addition, the polyaddition of Bis-CC and DETA was conducted at room temperature for 24 hours. The mixture became viscous after several hours.

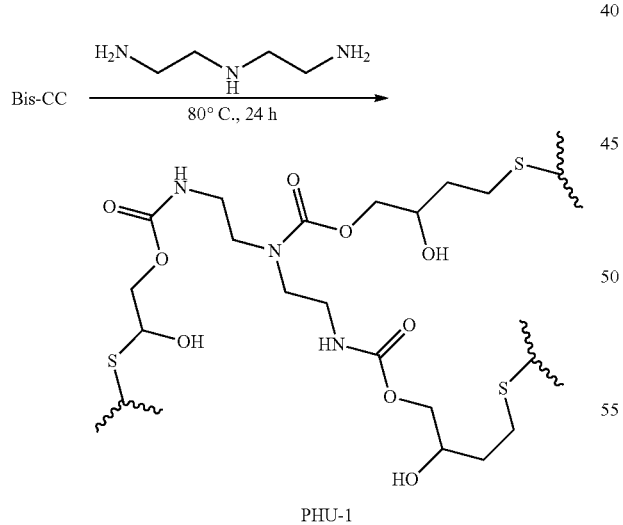

PHU-1

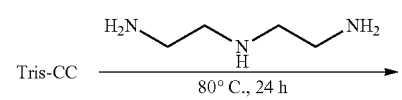

Example 2

Preparation of PHU-2

The procedure was the same as above using trimethylolpropane tris(3-mercaptopropionate) (6.70 g, 16.8 mmol), 4-vinyl-1,3-dioxolan-2-one (5.85 g, 51.3 mmol), and 2,2-dimethoxy-2-phenylacetophenone (12.5 mg, 48.8 μmol) to obtain Tris-CC. $^1$H NMR (500 MHz, CDCl$_3$, δ): 0.88 (t, J$_1$=7.41 Hz, CH$_3$CH$_2$, 3H), 1.48 (q, J$_1$=7.36 Hz, CH$_3$CH$_2$, 2H), 1.88-1.96 (m, CH$_2$, 3H), 2.00-2.17 (m, CH$_2$, 3H), 2.46-2.66 (m, CH$_2$, 6H), 2.66-2.78 (m, CH$_2$, 12H), 4.03 (br. S, O—CH$_2$C, 6H), 4.10 (t, J$_1$=8.50 Hz, O—CH$_2$CH, 3H), 4.57 (t, J$_1$=8.35 Hz, O—CH$_2$CH, 3H), and 4.87 (qd, J$_1$=7.83 Hz, J$_2$=4.26 Hz, O—CH, 3H). $^{13}$C NMR (126 MHz, CDCl$_3$, δ): 7.46 (CH$_3$), 23.03 (CH$_2$CH$_3$), 27.11 (S—CH$_2$), 27.26 (S—CH$_2$), 33.79 (CH$_2$), 34.56 (CH$_2$—C=O), 40.84 (CCH$_2$CH$_3$), 64.00 (CH$_2$CO$_2$), 69.29 (OCH$_2$CH), 75.58 (OCH$_2$CH), 154.8 (CO$_3$), and 171.4 (CH$_2$CO$_2$). ATR-IR (cm$^{-1}$): 468, 714, 770, 1055, 1153, 1236, 1286, 1352, 1382, 1476, 1725 (OC=O), 1783 (O$_2$C=O), 2926, and 2962. MS (m/z): calculated for C$_{30}$H$_{44}$O$_{15}$S$_3$, 740.18. found, 763.18 [M+Na]$^+$.

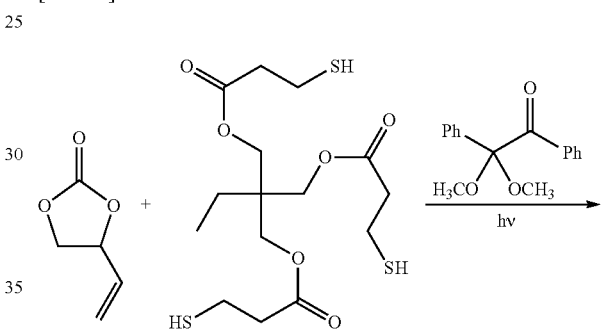

Tris-CC

PHU-2 was synthesized from Tris-CC prepared above (1.18 g, 1.60 mmol) and DETA (0.180 g, 1.75 mmol) without a catalyst for 24 hours.

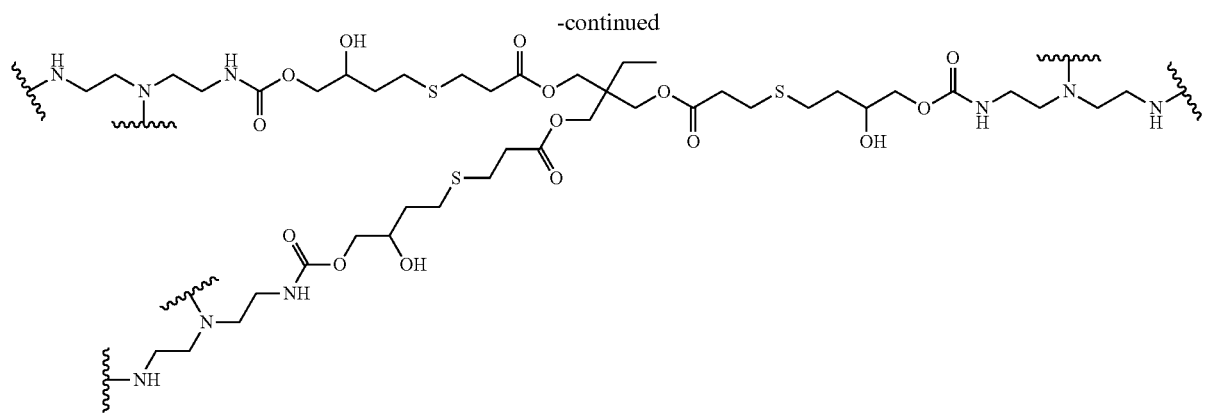

PHU-2

Example 3

Preparation of PHU-3

The procedure was the same as above using pentaerythritol tetrakis(3-mercaptopropionate) (8.40 g, 17.2 mmol), 4-vinyl-1,3-dioxolan-2-one (7.95 g, 69.6 mmol), and 2,2-dimethoxy-2-phenylacetophenone (11.9 mg, 46.4 μmol) to obtain Tetra-CC. $^1$H NMR (500 MHz, CDCl$_3$, δ): 1.89-1.96 (m, CH$_2$, 4H), 2.04-2.11 (m, CH$_2$, 4H), 2.58-2.65 (m, CH$_2$, 12H), 2.69-2.78 (m, CH$_2$, 12H), 4.09-4.16 (m, 12H), 4.58 (t, J$_1$=8.35 Hz, OCH$_2$CH, 4H), and 4.87 (qd, J$_1$=7.88, J$_2$=4.41 Hz, OCH$_2$CH, 4H). $^{13}$C NMR (126 MHz, CDCl$_3$, δ): 27.06 (S—CH$_2$), 27.25 (S—CH$_2$), 33.74 (CH$_2$), 34.47 (CH$_2$—C=O), 42.21 [(CH$_2$)$_4$—C], 62.36 (CH$_2$CO$_2$), 69.31 (OCH$_2$CHO), 75.63 (OCH$_2$CH), 154.9 (CO$_3$), and 171.3 (CH$_2$CO$_2$). ATR-IR (cm$^{-1}$): 714, 769, 1054, 1154, 1236, 1352, 1382, 1478, 1728 (OC=O), 1781 (O$_2$C=O), 2926, and 2962. MS (m/z): calculated for C$_{37}$H$_{52}$O$_{20}$S$_4$, 944.19. found, 967.18 [M+Na]$^+$.

PHU-3 was synthesized from Tetrakis-CC prepared above (1.154 g, 1.22 mmol) and DETA (0.174 g, 1.69 mmol) without a catalyst for 24 hours.

PHU-3

Example 4

Preparation of PHU-4

The polymerization of Bis-CC and 1,6-diaminohexane using 10 and 24 mol % DETA (mole ratio of DETA to cyclic carbonate) were conducted for 24 hours to generate PHU-4a and PHU-4-b, respectively. For example, PHU-4a was produced from Bis-CC (1.143 g, 3.02 mmol), 1,6-diaminohexane (0.247 g, 2.13 mmol), and DETA (74.4 mg, 0.721 mmol).

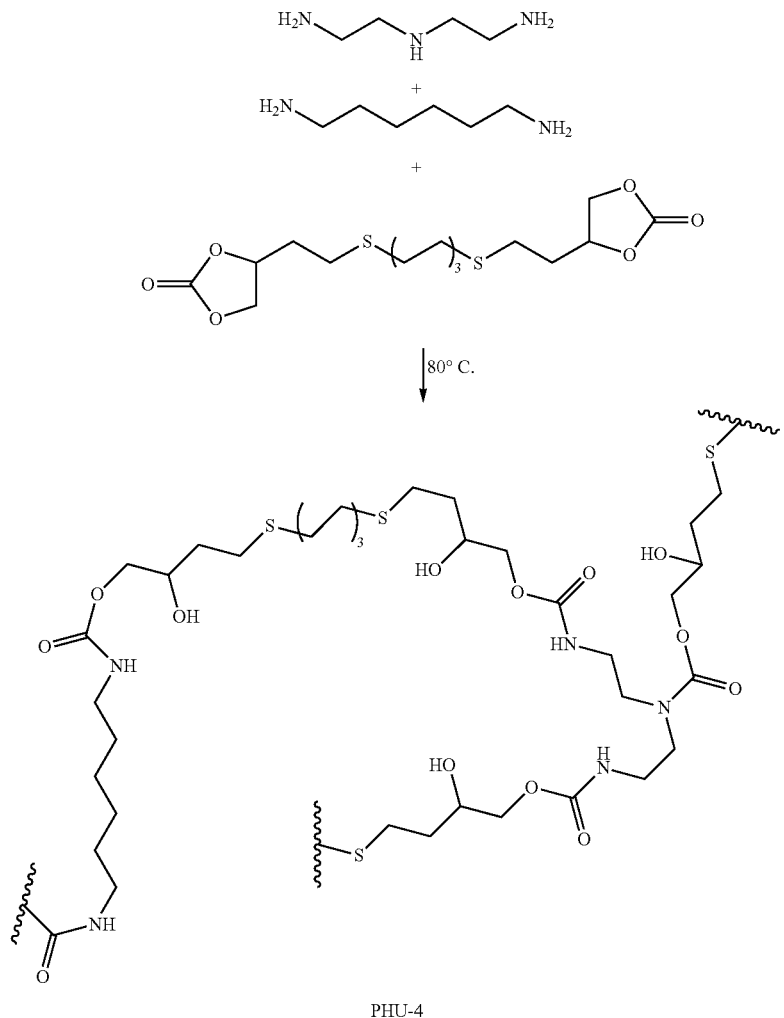

PHU-4

Example 5

Glass Transition and Thermal Decomposition Temperature

Thermal decomposition temperatures ($T_d$) for each composition prepared in the examples above were determined using thermal gravimetric analysis. $T_d$ was determined as 5% mass loss at a heating rate of 10° C./min under nitrogen.

In addition, a differential scanning calorimeter was used to determine the glass transition temperature ($T_g$), which is equal to the mean of the second and third heating scans, under nitrogen at a heating rate of 10° C./min.

Table 1 summarizes $T_g$ and $T_d$. From the DSC analysis, PHU-1s have $T_g$ between 3 and 12° C. The $T_g$ of PHUs produced with and without a catalyst (polymerization time=72 hours) are similar. PHU-2 and PHU-3 ha similar $T_g$ even though the functionality of these cyclic carbonates is different. Furthermore, the $T_g$ of poly(hydroxyl urethane)s produced from Bis-CC, 1,6-diaminohexane, and DETA ranges from 1 to 7° C. Most PHUs are used in hydrogel or coating applications, but these materials exhibit good adhesive properties and are candidate materials for adhesive applications. The thermal stability of these polymers was measured with a thermogravimetric analyzer at a heating rate of 10° C./min under nitrogen atmosphere. The $T_d$ of PHU-1 (190° C.), produced using LiBr as a catalyst, is lower than that of the uncatalyzed system (217° C.). Both samples were analyzed twice; the result was consistent with the observation above. This result indicates that the catalyst accelerates the decomposition.

The polymerization of Bis-CC and DETA was allowed to proceed 24 and 72 hours; however, the longer polymerization time did not yield a more thermally stable polymer. Under the same polymerization conditions, the thermogravimetric results showed that PHU-1 (217° C.) has higher thermal stability than PHU-2 (193° C.) and PHU-3 (186° C.) This trend indicates that the thermal stability of these crosslinked PHUs decreases due to increasing density of C—S bond and qualitatively lower conversion is observed with increasing functionality. PHU-4-s have the highest $T_d$ (230° C.) of the polymers synthesized in this study, and the thermal stability of this system seems to be independent of the quantity of crosslinker.

TABLE 1

Decomposition temperatures ($T_d$) and Glass Transition Temperatures of Poly(hydroxyl urethane)s[a]

| Polymers | $T_d$[b] (° C.) | $T_g$ (° C.) |
|---|---|---|
| PHU-1[c] | — | 3 |
| PHU-1[d] | 190 | 11 |
| PHU-1 | 217 | 5 |
| PHU-1[e] | 208 | 12 |
| PHU-2 | 193 | 16 |
| PHU-3 | 186 | 16 |
| PHU-4a | 230 | −1 |
| PHU-4b | 231 | 7 |

[a]Polymerization was conducted at 80° C. for 24 hours without catalyst unless noted otherwise.
[b]Determined as 5% mass loss.
[c]Polymerization was conducted at room temperature.
[d]Used LiBr as a catalyst and polymerization time of 48 hours.
[e]Polymerization time was 72 hours.

Example 6

Adhesive Test

To test the strength of the polymer as an adhesive, 15 mg of PHU-3 or PHU 4 was applied to a 1 in.×1 in. portion of an aluminum plate, and a second identical aluminum plate was contacted with the first aluminum plate via the polymer. The setup was allowed to set overnight at room temperature or 80° C. Various weights were hung from the connected aluminum plates. FIG. 1 depicts one variation of the adhesive test performed for one or more embodiments of the composition. Aluminum plates bonded together using PHU-3 were surprisingly able to stay bonded with the addition of approximately 125 lbs. during the test.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following embodiments.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It should be noted that ratios, concentrations, amounts, and other numerical data may be expressed herein in a range format or as an approximation. It is to be understood that such a range or approximation is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

It must be noted that, as used in the specification and the appended embodiments, the singular forms "a," "an," and "the" include plural referents unless the context clearly dictates otherwise. Thus, for example, reference to "a support" includes a plurality of supports. In this specification and in the embodiments that follow, reference will be made to a number of terms that shall be defined to have the following meanings unless a contrary intention is apparent.

We claim:

1. A process for the preparation of a cross-linked poly(hydroxyl urethane), comprising: contacting (1) one or more compounds having at least one cyclic carbonate group, wherein the cyclic carbonate comprises one or more functional groups having one or more carbon-carbon double bonds or triple bonds; (2) one or more compounds having two or more thiol groups; and, (3) one or more compounds having two or more amine functional groups, wherein a cross-linked poly(hydroxyl urethane) composition is produced.

2. The process of claim 1, further comprising the step of contacting a second compound having two or more amine functional groups with compounds (1), (2) and (3).

3. The process of claim 1, wherein the contacting step is done in the absence of a solvent.

4. The process of claim 1, wherein the contacting step is done in the absence of a catalyst.

5. The process of claim 1, wherein the cyclic carbonate and compound having two or more thiol groups are contacted and exposed to UV light to form a multi-functional cyclic carbonate prior to contacting the compound having two or more amine functional groups.

6. The process of claim 1, wherein the cyclic carbonate and compound having two or more thiol groups are contacted and heated to form a multi-functional cyclic carbonate prior to contacting with the compound having two or more amine functional groups.

7. The process of claim 5, wherein the multi-functional cyclic carbonate and compound having two or more amine functional groups are contacted and heated at temperatures between about 25° C. and about 80° C. to form a cross-linked poly(hydroxyl urethane).

8. The process of claim 1, wherein the cyclic carbonate and compound having two or more amine functional groups are contacted and heated prior to contacting with the compound having two or more thiol groups.

* * * * *